United States Patent
Burtch et al.

[15] 3,707,059
[45] Dec. 26, 1972

[54] PAD FOR DISC SANDERS

[72] Inventors: Alfred H. Burtch, Sanborn; Halsey W. Buell, Niagara Falls, both of N.Y.

[73] Assignee: The Carborundum Company, Niagara Falls, N.Y.

[22] Filed: March 2, 1970

[21] Appl. No.: 15,707

[52] U.S. Cl. ................................... 51/358, 51/389
[51] Int. Cl. .............................................. B24d 17/00
[58] Field of Search........51/209, 358, 378, 389, 393, 51/394; 15/230

[56] References Cited

UNITED STATES PATENTS

| | | | |
|---|---|---|---|
| 2,371,021 | 3/1945 | Berry | 51/358 |
| 2,950,584 | 8/1960 | Welch | 51/378 |
| 3,081,584 | 3/1963 | Bullard | 51/209 R |
| 3,395,417 | 8/1968 | Matouka | 51/358 X |
| 3,418,675 | 12/1968 | Meguiar et al. | 15/230 |

*Primary Examiner*—Othell M. Simpson
*Attorney*—K. W. Brownell

[57] ABSTRACT

A sanding pad is made by adhesively joining a flexible, resilient disc and a relatively rigid backup member formed of a polycarbonate resin having mounting threads molded in the hub thereof.

10 Claims, 2 Drawing Figures

PATENTED DEC 26 1972  3,707,059

INVENTORS
ALFRED H. BURTCH
HALSEY W. BUELL
BY
K. W. Brownell

PAD FOR DISC SANDERS

BACKGROUND OF THE INVENTION

The present invention relates to pads for disc sanders. Such pads are widely used for mounting flexible sheets or discs of abrasive material, such, for example, as abrasive coated paper and cloth, for the performance of abrading operations such as grinding, sanding, buffing and polishing. The pads are adapted for attachment to a rotatable shaft which may be, and usually is, power driven. Hitherto, since considerable power is applied in such abrading operations, it was necessary to provide in the backup members of such pads internally threaded inserts whereby to attach the pads to a rotary shaft. Otherwise the stresses on the pads were sufficient to loosen and in some cases destroy them. However, molding of inserts into the backup pads is expensive and frequently difficult because of the differences in shrinkage after molding.

SUMMARY OF THE INVENTION

This problem is obviated and an improved sander pad is produced by forming the backup member of the pad of polycarbonate resin and molding mounting threads in the hub of the member.

SHORT DESCRIPTION OF THE DRAWINGS

DESCRIPTION OF A PREFERRED EMBODIMENT

Figure 1:
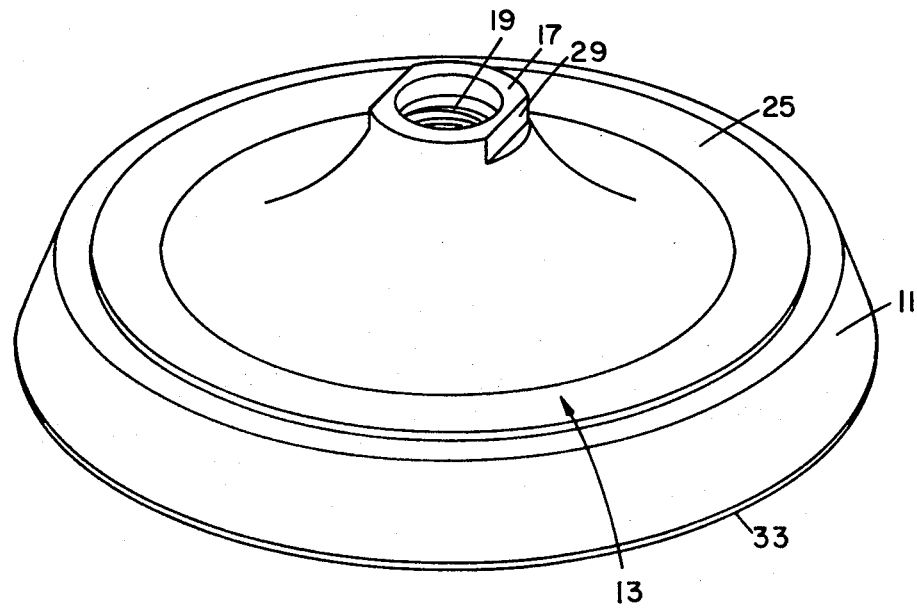
FIG. 1 is a perspective view of a pad according to the present invention.

Referring to the drawings it will be seen that the improved pad of the present invention comprises a disc member 11 and a backup member 13. The disc member 11 is of conventional shape and may be formed of a conventional material. Such discs have commonly been formed of compressible, flexible, resilient material, typical of which are the cellular, sponge-like products known as foamed plastics or elastomers, for example, foamed rubber, foamed polyurethane, and vinyl foam. Such products can be obtained in different grades having differences in hardness, porosity, compressibility and flexibility so as to permit a choice of supporting characteristics for the abrasive element used therewith. It is also known to employ flexible and resilient unfoamed discs such as those formed of rubber, polyurethane and the like.

Figure 2:
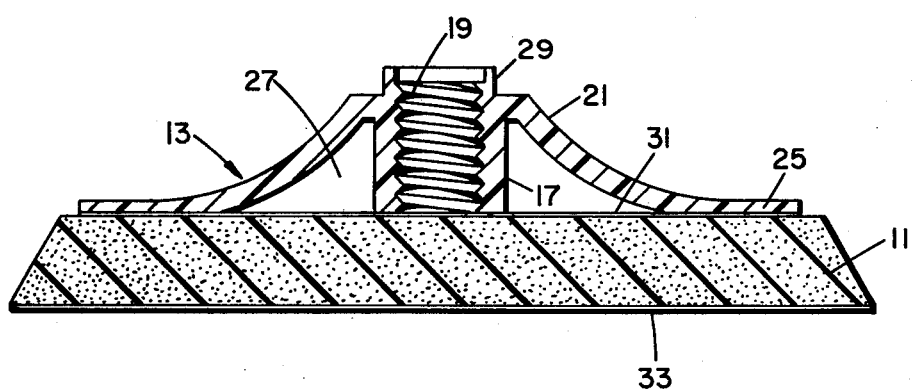
FIG. 2 is a transverse sectional view thereof.

The novel backup member 13 of the present invention is hot molded of polycarbonate resin as an integral unit and comprises a central hub 17 having an internally threaded axial passage 19 and a laterally extending, peripheral flange portion 21. As best seen in FIG. 2, the flange portion 21 joins the hub adjacent the outer end, i.e., the end remote from the disc 11, of the hub and flares outwardly toward the disc 11 so as to provide around its periphery an annular area 25 which is flat and preferably in the same plane as the inner end of the hub 17 and normal to the axis of the hub. This construction also provides an annular well 27 surrounding the hub. The outer end of the hub may be provided with a plurality of flats 29 on its outer surface to provide for engagement of a wrench in mounting it on a threaded shaft.

The disc 13 and backup member 11 are secured together by an adhesive layer 31. A contact adhesive is preferred because of its ease of use. Although a number of suitable flexible contact adhesives are available, good results are obtainable with an adhesive of the following composition:

| | Parts by Weight |
| --- | --- |
| Neoprene AC | 100 |
| Tertiarybutyl phenolic resin | 45 |
| Magnesia | 8.5 |
| Zinc oxide | 5 |
| Antioxidants | 2 |
| Toluene | 380 |

In assemblying the pad the adhesive is applied to a face of the disc 11 and to the flange and hub of the backup member 13 and allowed to dry. Then the adhesive coated surfaces are placed in contact and pressed firmly together to ensure a good bond. Preferably, a facing layer 33 of a suitable fabric, e.g., drills, is adhesively secured to the outer face of the disc, thus providing a harder, more wear resistant surface. If desired, a similar layer of suitable material may be employed intermediate the disc 11 and the backup member 13.

Pads according to the present invention may be produced with any desired diameter and thickness. The backup member 13 as compared to the disc 11 is relatively rigid, the annular flange 25 being deformable only with the exertion of considerable force, thus providing a firm support for the flexible disc. The thickness of the flanges 25 may be varied as desired to obtain the desired degree of support for the pad and the abrasive member which is attached thereto by suitable means such as a pressure sensitive adhesive. In general the backup members will have flanges that at their peripheries have a thickness of from about 0.8 mm to about 6.4 mm and the thickness of the discs will be in the range from about 3.2 mm to about 19.0 mm. The discs 11 and backup members 13 preferably are of about the same diameter although the discs are often slightly greater in diameter to provide a soft edge that will work into corners.

Pads according to the present invention are convenient and inexpensive to manufacture since there is no need to mold screw threaded inserts into the backup members or assemble anything but the disc and the backup member. They are also efficient and, as shown below, have very long useful lives. The superiority of pads according to the present invention is shown by the fact that in a severe fatigue test where pads according to this invention and pads differing therefrom only in using a molded polypropylene backup member instead of a polycarbonate member were compared, the pads according to this invention had a life nearly 5 times that of the polypropylene backed pads.

It will be understood that modifications can be made in pads according to the invention. For example, the discs may be formed of unfoamed rubber or other elastomeric material.

We claim:

1. A pad for abrasive disc sanders comprising a flexible, resilient disc and a relatively inflexible backup member adhesively attached thereto, said backup member having an internally threaded central hub and a laterally extending flange portion and being molded as an integral unit from polycarbonate resin, said hub being axially elongated and said flange portion extending radially outward from an area of said hub removed from said disc.

2. A pad as set forth in claim 1 in which said flange portion flares outwardly toward said disc.

3. A pad as set forth in claim 1 in which said disc is formed of a cellular, foamed, plastic material.

4. A pad as set forth in claim 2 in which said disc is formed of a cellular, foamed, plastic material.

5. A pad as set forth in claim 1 in which said flange, at its periphery, is thinner than said disc.

6. A pad as set forth in claim 2 in which said flange, at its periphery, is thinner than said disc.

7. A pad as set forth in claim 1 in which said hub of the backup member is axially elongated and said flange portion of said member flares radially outward toward said disc from an area of said hub removed from said disc, said flange having a flat peripheral area substantially in the same plane as the inner end of said hub.

8. A pad as set forth in claim 7 in which said disc is formed of a cellular, foamed, plastic material.

9. A relatively inflexible backup member molded as an integral unit from polycarbonate resin and adapted for use with a flexible, resilient disc in a pad for abrasive disc sanders comprising: an internally threaded, axially elongated, central hub and a flange portion that extends radially outward from said hub and has a flat peripheral area adapted for adhesive attachment to said resilient disc, said flange portion flaring outwardly from an area of said hub spaced axially from the plane of said flat peripheral area.

10. A backup member as set forth in claim 9 in which said flat peripheral area and the inner end of said hub are in substantially the same plane.

* * * * *